US011615314B2

(12) United States Patent
Lee et al.

(10) Patent No.: US 11,615,314 B2
(45) Date of Patent: Mar. 28, 2023

(54) APPARATUS AND METHOD FOR UNSUPERVISED DOMAIN ADAPTATION

(71) Applicant: SAMSUNG SDS CO., LTD., Seoul (KR)

(72) Inventors: JoonHo Lee, Seoul (KR); Minyoung Lee, Seoul (KR); Joonseok Lee, Seoul (KR); JiEun Song, Seoul (KR); Sooah Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 261 days.

(21) Appl. No.: 17/082,364

(22) Filed: Oct. 28, 2020

(65) Prior Publication Data

US 2021/0133585 A1   May 6, 2021

(30) Foreign Application Priority Data

Oct. 30, 2019   (KR) .................. 10-2019-0136491

(51) Int. Cl.
 *G06N 3/08*   (2023.01)
 *G06N 3/084*   (2023.01)
 (Continued)

(52) U.S. Cl.
 CPC ........... *G06N 3/084* (2013.01); *G06F 18/214* (2023.01); *G06N 3/088* (2013.01); *G06N 5/046* (2013.01); *G06N 7/08* (2013.01); *G06N 20/20* (2019.01)

(58) Field of Classification Search
 CPC ........ G06N 3/084; G06N 3/088; G06N 20/20; G06N 5/046; G06N 7/08; G06K 9/6256
 See application file for complete search history.

(56) References Cited

PUBLICATIONS

Kurmi et al., Curriculum Based Dropout Discriminator for Domain Adaptation, Jul. 2019. (Year: 2019).*

(Continued)

*Primary Examiner* — Kamran Afshar
*Assistant Examiner* — Marshall L Werner
(74) *Attorney, Agent, or Firm* — The PL Law Group, PLLC

(57) ABSTRACT

An apparatus is for unsupervised domain adaptation for allowing a deep learning model with supervised learning on a source domain completed to be subjected to unsupervised domain adaptation to a target domain. The apparatus includes a first learning unit to perform a forward pass by inputting a pair $(x_s^i, y_s^i)$ of first data $x_s^i$ of the source domain and a label $y_s^i$ for each of the first data and second data $x_T^j$ belonging to the target domain, and insert a dropout following a Bernoulli distribution into the deep learning model in performing the forward pass, and a second learning unit to perform a back propagation to minimize uncertainty about the learning parameter of the deep learning model by using a predicted value for each class output through the forward pass and the label $y_s^i$, and an uncertainty vector for the second data $x_T^j$ output through the forward pass as inputs.

14 Claims, 14 Drawing Sheets

(51) Int. Cl.
*G06N 3/088* (2023.01)
*G06N 5/046* (2023.01)
*G06N 20/20* (2019.01)
*G06N 7/08* (2006.01)
*G06F 18/214* (2023.01)

(56) References Cited

PUBLICATIONS

Ganin et al., Unsupervised Domain Adaptation by Backpropagation, Feb. 2015. (Year: 2015).*
Srivastava et al., Dropout: A Simple Way to Prevent Neural Networks from Overfitting, Journal of Machine Learning Research 15 (2014), pp. 1929-1958, 2014. (Year: 2014).*
Han et al., Unsupervised Domain Adaptation via Calibrating Uncertainties, Jul. 2019. (Year: 2019).*
Pei et al., Multi-Adversarial Domain Adaptation, Sep. 2018. (Year: 2018).*
Saito et al., Semi-supervised Domain Adaptation via Minimax Entropy, Sep. 2019. (Year: 2019).*
Rakshit et al., Class Consistency Driven Unsupervised Deep Adversarial Domain Adaptation, 2019 IEEE/CVF Conference on Computer Vision and Pattern Recognition Workshops (CVPRW), Jun. 2019. (Year: 2019).*
Saito et al., Adversarial Dropout Regularization, Mar. 2018. (Year: 2018).*

* cited by examiner

T=1, no dropout inference

T=3, dropout inferences

T=5, dropout inferences

T=10, dropout inferences

T=30, dropout inferences

T=50, dropout inferences

FIG. 10

| source domain | SVHN | SYNSIG | MNIST | MNIST* | USPS |
|---|---|---|---|---|---|
| target domain | MNIST | GTSRB | USPS | ISPS* | MNIST |
| source only | 67.1 | 85.1 | 76.7 | 79.4 | 63.4 |
| DANN | 71.1 | 88.7 | 77.1±1.8 | 85.1 | 73.0±0.2 |
| ADDA | 76.0±1.8 | - | 89.4±0.2 | - | 90.1±0.8 |
| MCDDA | 96.2±0.4 | 94.4±0.3 | 94.2±0.7 | 96.5±0.3 | 94.1±0.3 |
| GPDA | 98.2±0.1 | 96.2±0.2 | 96.5±0.2 | 98.1±0.1 | 96.4±0.1 |
| the present disclosure | 99.1±0.4 | 98.6±0.5 | 97.9±0.2 | 98.5±0.1 | 96.7±0.4 |

APPARATUS AND METHOD FOR UNSUPERVISED DOMAIN ADAPTATION

CROSS-REFERENCE TO RELATED APPLICATION

This application claims the benefit under 35 USC § 119(a) of Korean Patent Application No. 10-2019-0136491, filed on Oct. 30, 2019, in the Korean Intellectual Property Office, the entire disclosure of which is incorporated herein by reference for all purposes.

BACKGROUND

1. Field

Exemplary embodiments relate to an unsupervised domain adaptation technique based on uncertainty.

2. Description of Related Art

In general, supervised learning based on a deep learning model works well when being allowed to be learnt using large scale-data secured from various sources, but it is necessary to perform annotation work such as designating a label on all learning data. In this case, it is often difficult to secure labeled data depending on a domain, and thus the scale of data is often insufficient. When learning is performed using small and medium-scale data in this way, a domain bias of data may occur. That is, the deep learning model performs a task well for data of a domain to which learning data mainly belongs, but a domain shift problem in which performance is poor for data of a domain with different characteristics may occur.

In order to solve such a problem, a domain adaptation technique was proposed in which the deep learning model is allowed to be learnt using data from a source domain where it is relatively easy to secure a label, and then knowledge learnt from the source domain is transferred to a target domain where it is difficult to secure a label. Such a domain adaptation technique is an unsupervised learning method with little or no label of the target domain, and is a kind of transfer learning.

Meanwhile, the conventional domain adaptation technique has mainly focused on solving the problem of covariate shift or data imbalance between the source domain and the target domain, and recently, unsupervised domain adaptation techniques have been studied in earnest for the deep learning model. The unsupervised domain adaptation technique undergoes a learning process that simultaneously uses labeled data of the source domain and unlabeled data of the target domain based on the deep learning model with supervised learning on the source domain completed, and the deep learning model with domain adaptation through this learning process finished is evaluated for its performance with accuracy shown in the target domain. Adversarial discriminative domain adaptation (ADDA), maximum classifier discrepancy domain adaptation (MCDDA), and gaussian process-endowed domain adaptation (GPDA) have been suggested as unsupervised domain adaptation techniques, but these adaptation techniques have several problems. Specifically, ADDA and MCDDA have inconvenience of physically separating the deep learning model into a feature generator and a classifier in the learning process. In addition, GPDA uses a Bayesian Deep Neural Network in the form of a Gaussian Process (GP) and has better performance than MCDDA, but since GPDA does not use a general deep learning model, many changes are needed to apply GPDA to an existing learning model. In addition, GPDA has a problem in that one-time train-time as well as a repeated test-time is lengthened due to an increase in a calculation amount for GP implementation.

SUMMARY

Exemplary embodiments are intended to provide means of transferring performance results learnt from the source domain to the target domain with an uncertainty index for a learning parameter of the deep learning model as a reference without changing a structure of the deep learning model used for learning in the source domain.

According to an exemplary embodiment, there is provided an apparatus for unsupervised domain adaptation for a deep learning model with supervised learning on a source domain completed to be subjected to unsupervised domain adaptation to a target domain, the apparatus including: a first learning unit configured to perform a forward pass by respectively inputting a pair $(x_s^i, y_s^i)$ of a plurality of first data $x_s^i$ belonging to the source domain and a label $y_s^i$ for each of the first data and a plurality of second data $x_T^j$ belonging to the target domain, and insert a dropout following a Bernoulli distribution, which is a trial probability p, into the deep learning model in a process of performing the forward pass; and a second learning unit configured to perform a back propagation to minimize uncertainty about the learning parameter of the deep learning model by respectively using a predicted value for each class output through the forward pass and the label $y_s^i$, and an uncertainty vector for the second data $x_T^j$ output through the forward pass as inputs.

The first learning unit may be further configured to insert the dropout in a Monte-Carlo sampling scheme.

The first learning unit may be further configured to iteratively perform the forward pass T times for one input value, the predicted value for each class may be an average value of T score vectors for a class output when the pair $(x_s^i, y_s^i)$ of the first data $x_s^i$ and the label $y_s^i$ is input to the deep learning model, and the uncertainty vector may be a standard deviation of T score vectors for a class output when the second data $x_T^j$ is input to the deep learning model.

The first learning unit may be further configured to logically classify a front end of a layer into which the dropout is inserted first and the rest of the layer excluding the front end into a feature generator and a classifier, respectively, with the layer as a reference.

The second learning unit may be further configured to adjust the learning parameter of the deep learning model by performing the back propagation so that a value of a loss function for the predicted value for each class and the label $y_s^i$ is minimized.

The second learning unit may be further configured to adjust the learning parameter of the deep learning model by performing the back propagation in a manner of setting the value of the loss function for the uncertainty vector as an uncertainty index and allowing the uncertainty index to be learnt by the feature generator and the classifier, respectively, with Mini-Max.

The uncertainty index may be a value obtained by taking L1 Norm or L2 Norm of the uncertainty vector uncertainty vector.

The apparatus for unsupervised domain adaptation may further include an inference unit configured to perform inference through the deep learning model while the dropout is being removed after the unsupervised domain adaptation of the deep learning model has been completed.

According to another exemplary embodiment, there is provided a method for allowing a deep learning model with supervised learning on a source domain completed to be subjected to unsupervised domain adaptation to a target domain, the method including: performing a forward pass by respectively inputting a pair $(x_s^i, y_s^i)$ of a plurality of first data $x_s^i$ belonging to the source domain and a label $y_s^i$ for each of the first data and a plurality of second data $x_T^j$ belonging to the target domain; and inserting a dropout following a Bernoulli distribution, which is a trial probability p, into the deep learning model in a process of performing the forward pass; and performing a back propagation to minimize uncertainty about the learning parameter of the deep learning model by respectively using a predicted value for each class output through the forward pass and the label $y_s^i$, and an uncertainty vector for the second data $x_T^j$ output through the forward pass as inputs.

The inserting of the dropout may include inserting the drop out in a Monte-Carlo sampling scheme.

The performing of the forward pass may include iteratively performing the forward pass T times for one input value, the predicted value for each class may be an average value of T score vectors for a class output when the pair $(x_s^i, y_s^i)$ of the first data $x_s^i$ and the label $y_s^i$ is input to the deep learning model, and the uncertainty vector may be a standard deviation of T score vectors for a class output when the second data $x_T^j$ is input to the deep learning model.

The method for unsupervised domain adaptation may further include logically classifying a front end of a layer into which the dropout is inserted first and the rest of the layer excluding the front end into a feature generator and a classifier, respectively, with the layer as a reference.

The performing of the back propagation may include adjusting the learning parameter of the deep learning model by performing the back propagation so that a value of a loss function for the predicted value for each class and the label $y_s^i$ is minimized.

The performing of the back propagation may include adjusting the learning parameter of the deep learning model by performing the back propagation in a manner of setting the value of the loss function for the uncertainty vector as an uncertainty index and allowing the uncertainty index to be learnt by the feature generator and the classifier, respectively, with Mini-Max.

The uncertainty index may be a value obtained by taking L1 Norm or L2 Norm of the uncertainty vector uncertainty vector.

The method for unsupervised domain adaptation may further include performing inference through the deep learning model while the dropout is being removed after the unsupervised domain adaptation of the deep learning model has been completed.

BRIEF DESCRIPTION OF THE DRAWINGS

FIG. 10 is an example of comparing performance of the method for unsupervised domain adaptation according to an embodiment with another method for unsupervised domain adaptation.

DETAILED DESCRIPTION

Hereinafter, specific embodiments of the present invention will be described with reference to the accompanying drawings. The following detailed description is provided to aid in a comprehensive understanding of a method, a device and/or a system described in the present specification. However, the detailed description is only for illustrative purpose and the present invention is not limited thereto.

In describing the embodiments of the present invention, when it is determined that a detailed description of known technology related to the present invention may unnecessarily obscure the gist of the present invention, the detailed description thereof will be omitted. In addition, terms to be described later are terms defined in consideration of functions in the present invention, which may vary depending on intention or custom of a user or operator. Therefore, the definition of these terms should be made based on the contents throughout this specification. The terms used in the detailed description are only for describing the embodiments of the present invention and should not be used in a limiting sense. Unless expressly used otherwise, a singular form includes a plural form. In this description, expressions such as "including" or "comprising" are intended to indicate any property, number, step, element, and some or combinations thereof, and such expressions should not be interpreted to exclude the presence or possibility of one or more other properties, numbers, steps, elements other than those described, and some or combinations thereof.

Figure 1:
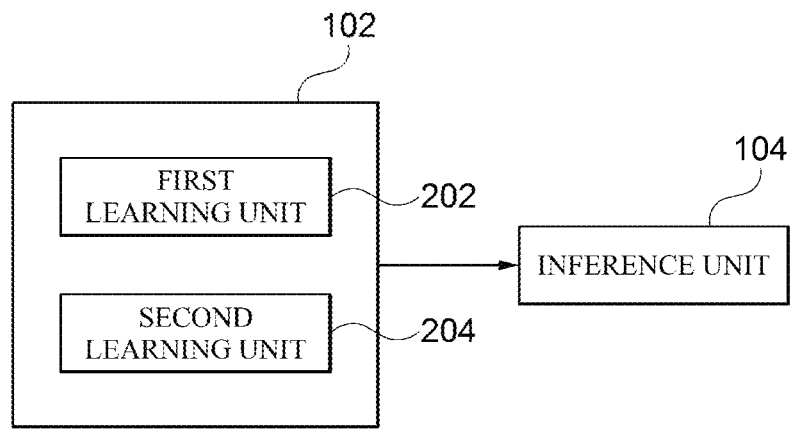
FIG. 1 is a block diagram illustrating a detailed configuration of an apparatus for unsupervised domain adaptation according to an embodiment.
Figure 2:
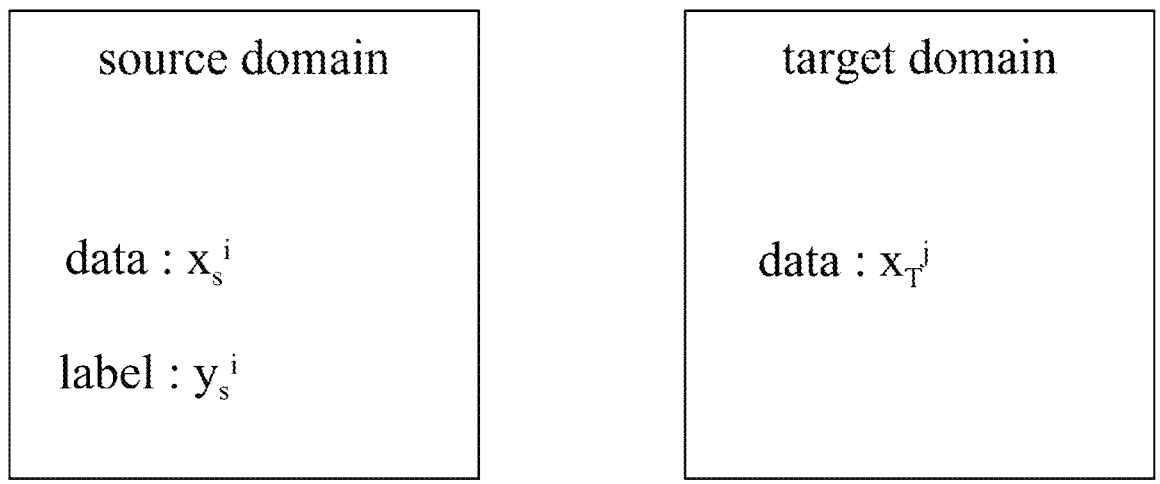
FIG. 2 is an example of a source domain and a target domain according to an embodiment.

FIG. 1 is a block diagram illustrating a detailed configuration of an apparatus 100 for unsupervised domain adaptation according to an embodiment, and FIG. 2 is an example of a source domain and a target domain according to an embodiment. In addition, FIG. 3 is an example of a result after unsupervised domain adaptation according to an embodiment has been completed.

In the present embodiments, the apparatus 100 for unsupervised domain adaptation is an apparatus for allowing a deep learning model with supervised learning on the source domain completed to be subjected to unsupervised domain adaptation to a target domain. Here, the source domain is a domain including a pair of data and a label, and the target domain is a domain including only data.

Referring to FIG. 2, the source domain includes a pair ($x_s^i$, $y_s^i$) of a plurality of first data $x_s^i$ and a label $y_s^i$ for each of the first data, and the target domain includes a plurality of second data $x_T^j$. In this case, the target domain does not include little or no labels for each of the second data $x_T^j$. Accordingly, the apparatus 100 for unsupervised domain adaptation undergoes a learning process in which labeled data of the source domain and unlabeled data of the target domain are simultaneously used based on the deep learning model with supervised learning on the source domain completed. The deep learning model with domain adaptation finished through this learning process works well in the target domain.

Figure 3:
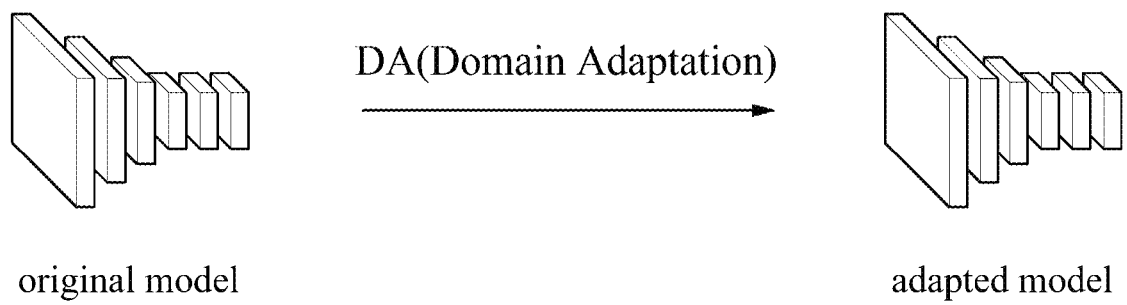
FIG. 3 is an example illustrating a result after unsupervised domain adaptation according to an embodiment has been completed.

Referring to FIG. 3, the deep learning model (i.e., the original model) on the left represents a model with supervised learning on the source domain completed, and the deep learning model (i.e., the adapted model) on the right represents a model with unsupervised domain adaptation on the source domain completed. The apparatus 100 for unsupervised domain adaptation may optimize a learning parameter of the original model so that the original model, i.e., a model with supervised learning on the source domain completed, operates well in the target domain. To this end, the apparatus 100 for unsupervised domain adaptation performs unsupervised domain adaptation based on uncertainty of the deep learning model unlike the conventional unsupervised domain adaptation technique.

Figure 4:
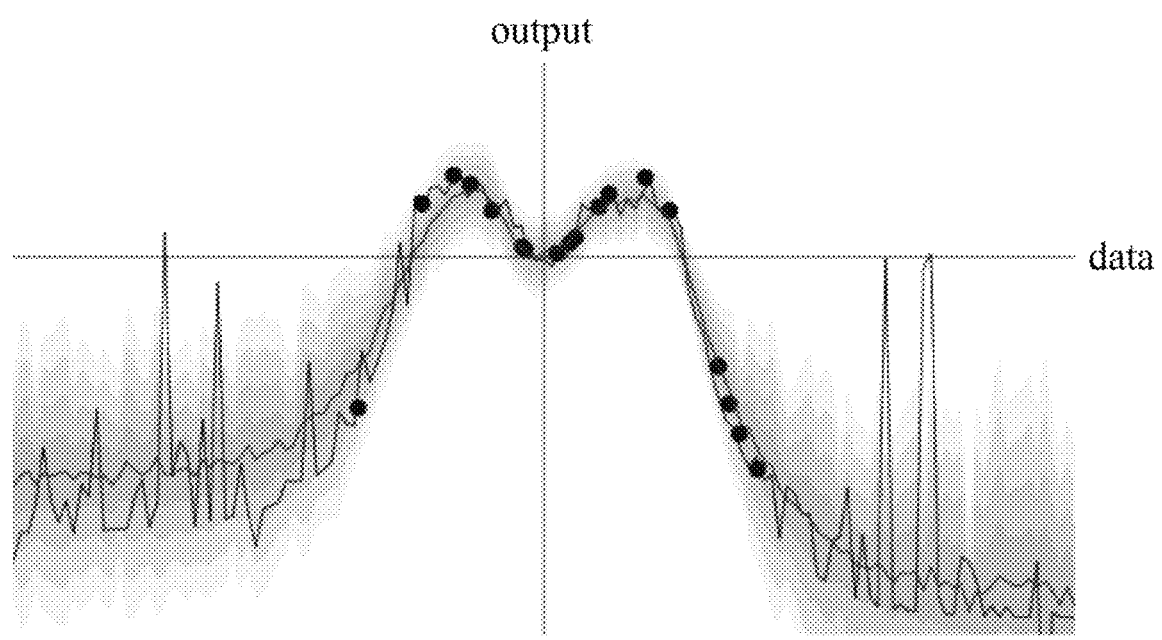
FIG. 4 is a graph illustrating uncertainty of a deep learning model according to an embodiment.

FIG. 4 is a graph illustrating uncertainty of a deep learning model according to an embodiment.

The horizontal axis of the graph illustrated in FIG. 4 represents data, and the vertical axis represents a predicted value output through the deep learning model when the data is used as an input value. It can be considered that as a standard deviation of the predicted values for the same data increases, i.e., as an amplitude of the vertical axis of the graph illustrated in FIG. 4 increases, uncertainty of the deep learning model for the corresponding data increases. In FIG. 4, it can be seen that the uncertainty of the deep learning model for data outside the graph is greater than the uncertainty of the deep learning model for data in the center of the graph. Hereinafter, a method for unsupervised domain adaptation performed by the apparatus 100 for unsupervised domain adaptation according to an embodiment will be described in more detail.

Returning to FIG. 1 again for this purpose, the apparatus 100 for unsupervised domain adaptation according to an embodiment includes a learning unit 102 and an inference unit 104.

The learning unit 102 performs a learning process (or adaptation process) for optimizing the learning parameter of the deep learning model with supervised learning on the source domain completed to be adapted for the target domain. Here, the learning unit 102 may include a first learning unit 202 performing a forward pass and a second learning unit 204 performing a back propagation.

The first learning unit 202 performs a forward pass by respectively inputting a pair ($x_s^i$, $y_s^i$) of a plurality of first data $x_s^i$ belonging to the source domain and a label $y_s^i$ for each of the first data and a plurality of second data $x_T^j$ belonging to the target domain, but inserts a dropout following a Bernoulli distribution, which is a trial probability p, into the deep learning model in a process of performing the forward pass.

The second learning unit 204 performs a back propagation to minimize uncertainty about a learning parameter of the deep learning model by respectively using a predicted value y-prediction for each class output through the forward pass and the label $y_s^i$, and an uncertainty vector uncertainty vector for the second data $x_T^j$ output through the forward pass as inputs.

The inference unit 104 performs inference through the deep learning model with unsupervised domain adaptation on the source domain completed through the learning unit 102. As will be described later, after the unsupervised domain adaptation of the deep learning model has been completed, the inference unit 104 may perform inference through the deep learning model while the dropout is being removed.

Figure 5:
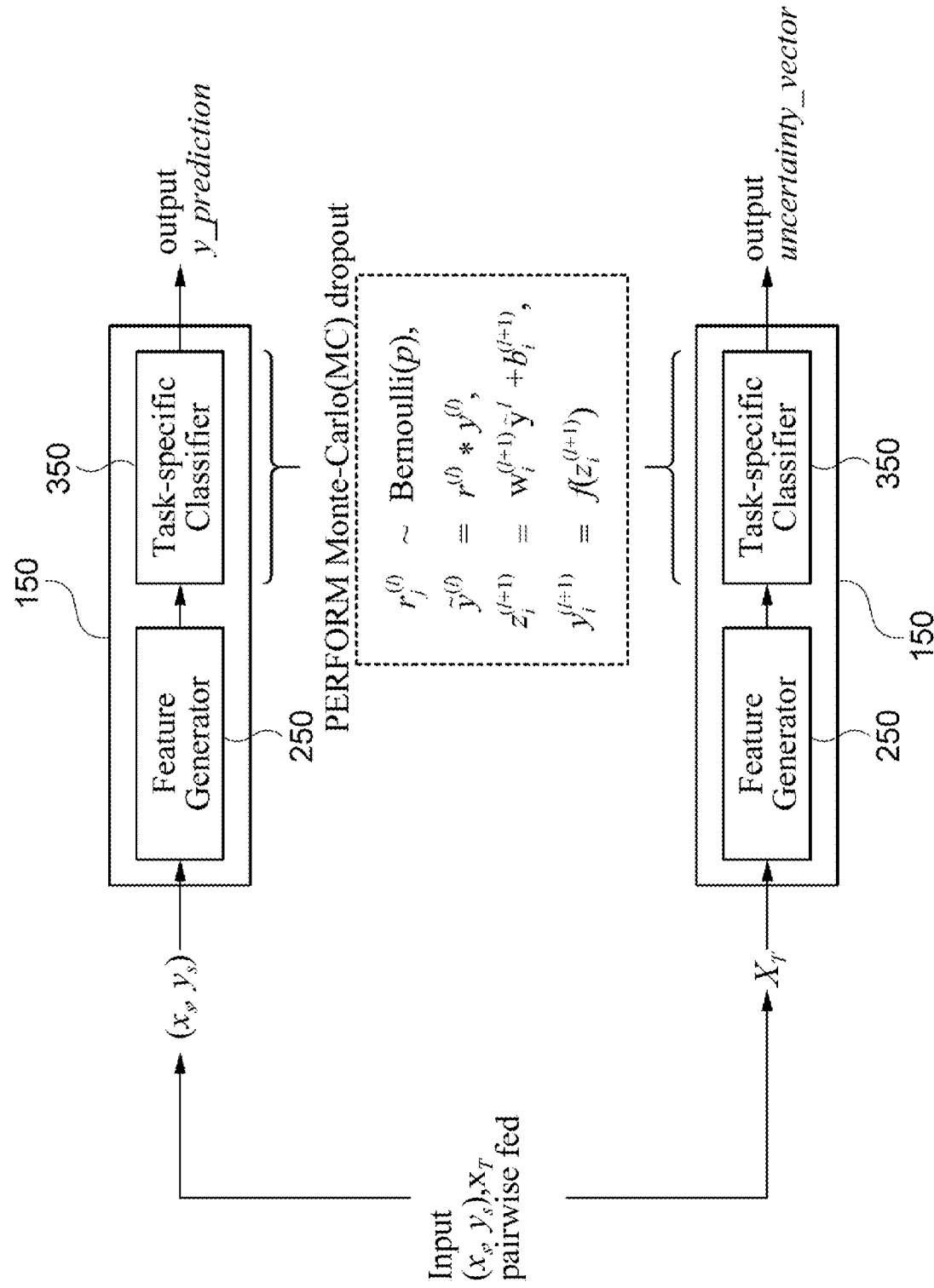
FIG. 5 is an example for describing a method for unsupervised domain adaptation performed in a first learning unit according to an embodiment.

FIG. 5 is an example for describing a method for unsupervised domain adaptation performed in the first learning unit 202 according to an embodiment.

As described above, the first learning unit 202 performs the forward pass by respectively inputting the pair ($x_s^i$, $y_s^i$) of the plurality of first data $x_s^i$ and the label $y_s^i$ that belong to the source domain and the plurality of second data $x_T^j$ belonging to the target domain to the deep learning model 150. In this case, the first learning unit 202 may insert the dropout following the Bernoulli distribution, which is a trial probability p, into the deep learning model at runtime in which inference occurs in the process of performing the forward pass.

The dropout is a technique that randomly excludes neurons of the model during learning to prevent overfitting of the model, and it is common to insert a dropout during learning and disable the dropout during inference. However, in the present embodiments, the first learning unit 202 may insert the dropout into the deep learning model 150 at runtime during which inference occurs in the process of performing the forward pass. In this case, the first learning unit 202 may insert the dropout into the deep learning model 150 in the Monte-Carlo sampling scheme. Here, a position of a layer into which the dropout is first inserted may vary according to a structure (e.g., ResNet, GoogleNet, VGGNet, etc.) of the deep learning model 150, and the first learning unit 202 may designate a specific layer to insert the dropout.

The first learning unit 202 may logically classify a front end of the layer into which the dropout is inserted first and the rest of the layer excluding the front end into a feature generator 250 and a classifier 350, respectively, with the layer as a reference, and accordingly, unlike conventional ADDA, MCDDA, etc., there is no need to physically separate the deep learning model 150.

In addition, a technique of subjecting the classifier 350 to Bayesian approximation of the classifier 350 by inserting the dropout in the Monte-Carlo sampling scheme in this way is referred to as MC dropout, and even if there is no dropout in the deep learning model 150 with unsupervised domain adaptation on the source domain completed, the same effect as the MC dropout can be achieved by simply inserting the dropout into the deep learning model 150 so as to follow the Bernoulli distribution, which is the trial probability p, at runtime during which inference occurs without changing the model structure. When using such a method, it is possible to output not only the predicted value of inference, but also an uncertainty index measured based on variance (or standard deviation) of the prediction for a specific input value together, without structural modification of the original model. Here, the number of sampling times and the trial probability p of the MC dropout become hyperparameters. As an example, the number of sampling times for the MC dropout may be 20 times, and the trial probability p may be 0.4.

If such an MC dropout is expressed as an expression, it is as follows.

First, f(x) is a neuron's activation function, and an input $y_i^{(l)}$ is multiplied by a network's weight $w_i^{(l+1)}$ to obtain $y_i^{(l+1)}$ as an output.

$$z_i^{l+1} = w_i^{(l+1)} y^l + b_i^{(l+1)},$$

$$y_i^{(l+1)} = f(z_i^{(l+1)}),$$

Here, applying the dropout can be considered as multiplying the Bernoulli random variable $r_j^{(l)}$. Specifically, if the input $y^{(l)}$ is multiplied by $r^{(l)}$, which is a dropout random variable, as a result, the network becomes a thinned network $\tilde{y}^{(l)}$ is produced whose network decreases according to the value of $r^{(l)}$, which is multiplied by a weight $w^{(l+1)}$. In addition, the Bernoulli random variable $r_j^{(l)}$ means a random variable with two values of being the presence/absence of a unit, and refers to a variable whose mean is p and variance is p(1−p) if the probability that a unit exists is p.

$$r_j^{(l)} \sim \text{Bernoulli}(p),$$

$$\tilde{y}^{(l)} = r^{(l)} * y^{(l)},$$

$$z_i^{(l+1)} = w_i^{(l+1)} \tilde{y}^l + b_i^{(l+1)},$$

$$y_i^{(l+1)} = f(z_i^{(l+1)}).$$

The first learning unit 202 may perform the forward pass using the deep learning model 150 initialized with the parameters learnt by data of the source domain, i.e., $(x_s^i, y_s^i)$ described above. In this case, input values of the deep learning model 150 may be $(x_s^i, y_s^i)$ and $x_T^j$. The first learning unit 202 may sequentially input $(x_s^i, y_s^i)$ and $x_T^j$ to the deep learning model 150 to perform the forward pass. In this case, the first learning unit 202 may iteratively perform the forward pass T times for one input value.

As an example, the first learning unit 202 may iteratively perform the forward pass 20 times using $(x_s^1, y_s^1)$ as input values (Table 1), and may iteratively perform the forward pass 20 times using $x_T^1$ as the input value (Table 2). The data values (e.g., 0.80 in Table 1, 0.67 in Table 2, etc.) in Tables 1 and 2 below are score vectors for each class for a specific input value, indicating which class the input value is close to. For example, it can be considered that as the score vector for the class of the input value is closer to 1, the input value is closer to the corresponding class.

TABLE 1

| class | number of performance times | | | |
|---|---|---|---|---|
| | first | second | . . . | twentieth |
| Class 1 | 0.80 | 0.78 | . . . | 0.79 |
| Class 2 | 0.10 | 0.12 | . . . | 0.09 |
| . . . | . . . | . . . | . . . | . . . |
| Class 5 | 0.05 | 0.04 | . . . | 0.04 |

TABLE 2

| class | number of performance times | | | |
|---|---|---|---|---|
| | first | second | . . . | twentieth |
| Class 1 | 0.67 | 0.69 | . . . | 0.70 |
| Class 2 | 0.21 | 0.20 | . . . | 0.22 |
| . . . | . . . | . . . | . . . | . . . |
| Class 5 | 0.07 | 0.06 | . . . | 0.06 |

Through such a forward pass, the predicted value y-prediction for each class and the uncertainty vector uncertainty_vector for the second data $x_T^j$ may be respectively output.

Here, the predicted value y-prediction for each class may be an average of the T score vectors for the class output when the pair $(x_s^i, y_s^i)$ of the first data $x_s^i$ and the label $y_s^i$ is input to the deep learning model 150. As an example, the predicted value y-prediction for each class output when the forward pass is iteratively performed 20 times using $(x_s^i, y_s^i)$ as input values may be calculated as follows.

Predictive value for Class 1 = (0.80 + 0.78 + ... + 0.79)/20

Predictive value for Class 2 = (0.10 + 0.12 + ... + 0.09)/20

...

Predictive value for Class 5 = (0.05 + 0.04 + ... + 0.04)/20

In addition, the uncertainty vector uncertainty vector may be a standard deviation of T score vectors for the class output when the second data $x_T^j$ is input to the deep learning model 150. As an example, the uncertainty vector uncertainty_vector output when the forward pass is iteratively performed 20 times using $x_T^1$ as an input value may be calculated as follows.

Uncertainty vector for Class 1 = $\sigma_1$ = $\sigma(0.67, 0.69, ..., 0.70)$

Uncertainty vector for Class 2 = $\sigma_2$ = $\sigma(0.21, 0.20, ..., 0.22)$

...

Uncertainty vector for Class 5 = $\sigma_5$ = $\sigma(0.07, 0.06, ..., 0.06)$

In this way, the forward pass for $(x_s^1, y_s^1)$, $x_T^1$ is iteratively performed T times, so that the predicted value y-prediction and uncertainty vector uncertainty_vector for each class are output, respectively, and the output values are used as input values for back propagation performed by the second learning unit 204 to be described later. In addition, as forward pass-back propagation for $(x_s^1, y_s^1)$, $x_T^1$ is sequentially performed, at least some of the learning parameters of the deep learning model 150 are adjusted, and then the forward pass-back propagation for $(x_s^2, y_s^2)$, $x_T^2$ is sequentially performed in the same manner as described above. Then, as the forward pass-back propagation for input values with i=3, j=3, the forward pass-back propagation for input values with i=4, j=4, . . . are sequentially performed, the learning parameters of the deep learning model 150 are optimized.

Figure 6:
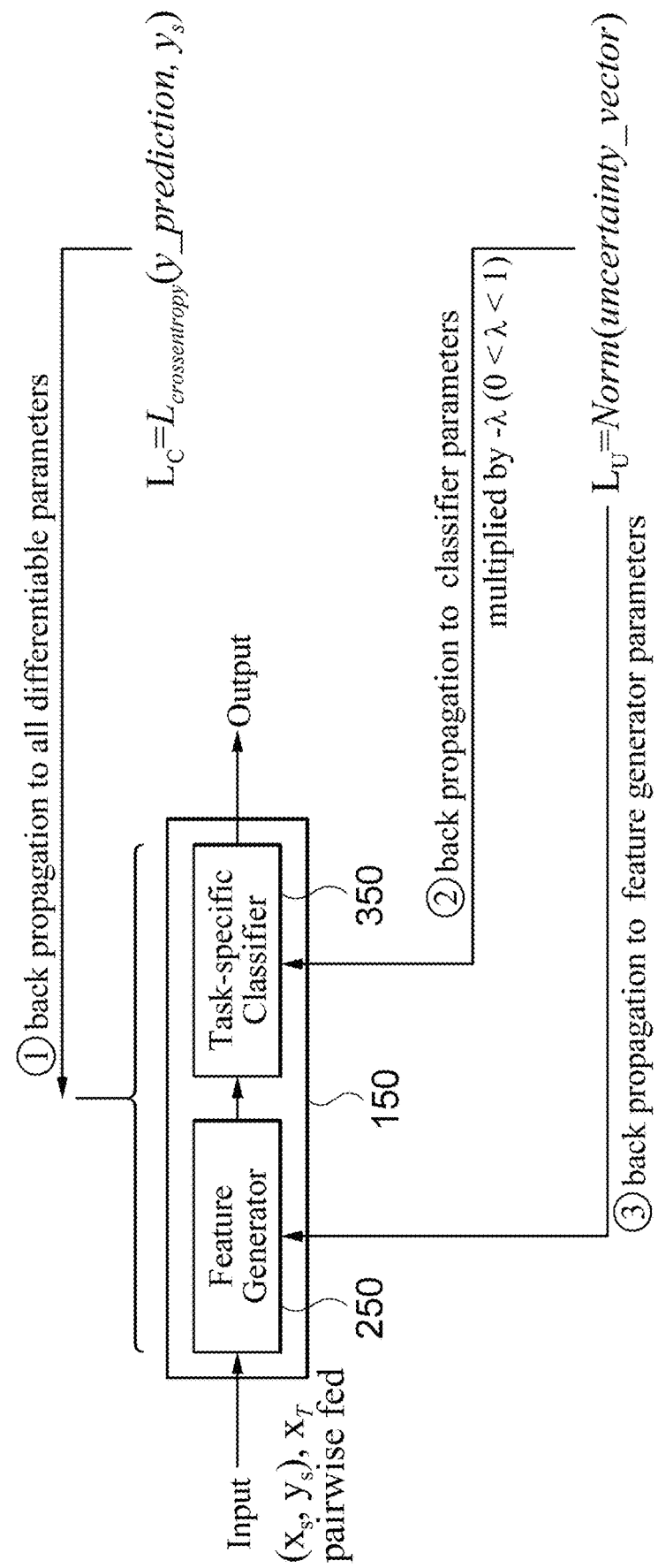
FIG. 6 is an example for describing the method for unsupervised domain adaptation performed in a second learning unit according to an embodiment.

FIG. 6 is an example for describing a method for unsupervised domain adaptation performed in the second learning unit 204 according to an embodiment.

As described above, the second learning unit 204 performs the back propagation to minimize the uncertainty about learning parameters of the deep learning model by respectively using the predicted value y-prediction for each class and the label $y_s^i$ output through the forward pass and the uncertainty vector uncertainty_vector for the second data $x_T^j$ output through the forward pass as inputs.

First, the second learning unit 204 may adjust the learning parameter of the deep learning model 150 by performing the back propagation so that a value Lc of the loss function for the predicted value y-prediction for each class and the label $y_s^i$ is minimized. Here, the loss function for the predicted value y-prediction for each class and the label $y_s^i$ may be, for example, a cross entropy error (CEE), a mean squared error (MSE), etc. of the predicted value y-prediction for each class and the label $y_s^i$. The second learning unit 204 may transfer a performance result learnt from the source domain to the target domain by adjusting the learning parameter of the deep learning model 150 so that the value Lc of the loss function is minimized.

Next, the second learning unit 204 may adjust the learning parameter of the deep learning model 150 by performing the back propagation in a manner of setting the value Lu of the loss function for the uncertainty vector uncertainty_vector as an uncertainty index and allowing the uncertainty index to be learnt by the feature generator 250 and the classifier 350, respectively, with Mini-Max. Here, the uncertainty index may be a value obtained by taking L1 Norm or L2 Norm of the uncertainty vector uncertainty_vector. The second learning unit 204 may perform the back propagation on the classifier 350 in the direction in which the uncertainty index becomes the maximum, and perform the back propagation on the feature generator 250 in the direction in which the uncertainty index becomes minimum. In this case, the second learning unit 204 may perform the back propagation on the classifier 350 while the uncertainty index is being multiplied by a coefficient $-\lambda$ ($0<\lambda<1$). Here, $\lambda$ may be, for example, 0.01. That is, the second learning unit 204 may perform the back propagation to satisfy Ben theorem through a Mini-Max learning scheme, and the learning parameters of the deep learning model 150 may be adjusted through such a process.

In this way, the learning unit 102 may sequentially perform the forward pass-back propagation for the i-th and j-th input values, and may perform mini-batch learning in this process. If some labels exist in the target domain, the learning unit 102 may measure performance of the deep learning model 150 with the label as a reference to determine whether or not the unsupervised domain adaptation has been completed. If the label does not exist at all in the target domain, the learning unit 102 may determine that the unsupervised domain adaptation has been completed when the uncertainty index is lowered to a certain level or is saturated to a specific value.

When it is determined that the unsupervised domain adaptation of the deep learning model 150 has been completed, the inference unit 104 may perform inference through the deep learning model 150 while the dropout is being removed. That is, according to an exemplary embodiment, in the learning process of unsupervised domain adaptation, the MC dropout is necessarily used, whereas after the unsupervised domain adaptation has been completed, the deep learning model 150 can be used in a general scheme of performing inference by removing the MC dropout. By doing so, there is an effect that there is no additional overhead compared to the process of initially performing learning on the source domain in the form of the model or the pipeline, except for performing learning of the unsupervised domain adaptation.

FIGS. 7A to 7F are examples of sequentially illustrating a process of allowing a deep learning model according to an embodiment to be subjected to unsupervised domain adaptation to the target domain. Here, the space of FIGS. 7A to 7F represent a feature space.

Figure 7A:
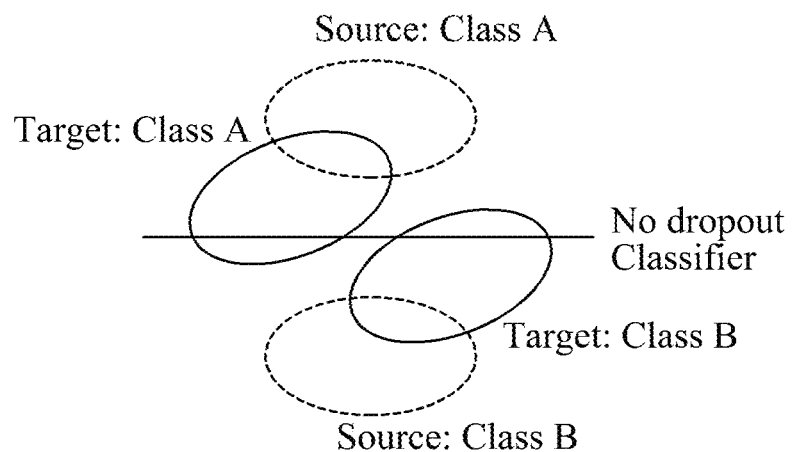
FIGS. 7A to 7F are examples for sequentially illustrating a process of allowing a deep learning model according to an embodiment to be subjected to unsupervised domain adaptation to a target domain.

Referring to FIG. 7A, it can be seen that performance degradation occurs when the deep learning model with supervised learning on the source domain completed is applied to the target domain. In this case, the deep learning model classifies classes well for the source domain, but does not properly classify the classes for the target domain.

Figure 7B:
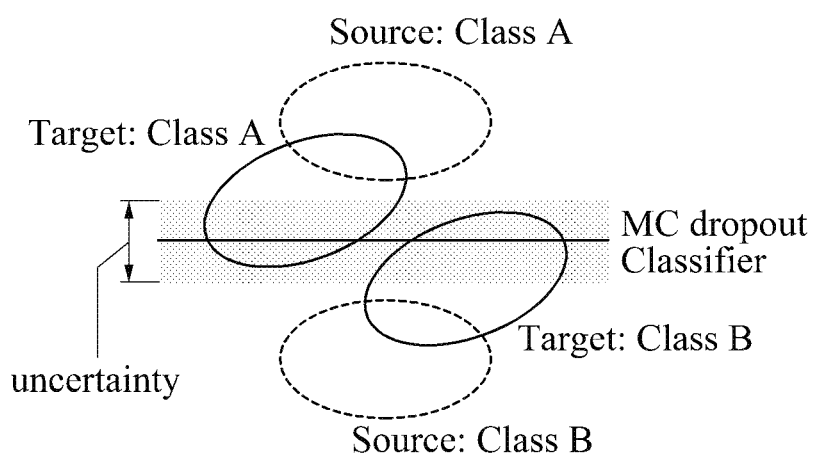

Referring to FIG. 7B, the uncertainty of the deep learning model was measured by inserting an MC dropout while performing the forward pass-back propagation with the method for unsupervised domain adaptation according to an exemplary embodiment. That is, the classifier 350 was subjected to Bayesian approximation by inserting a dropout in the Monte-Carlo sampling scheme according to an exemplary embodiment, and in this case, uncertainty was measured as illustrated in FIG. 7B.

Figure 7C:
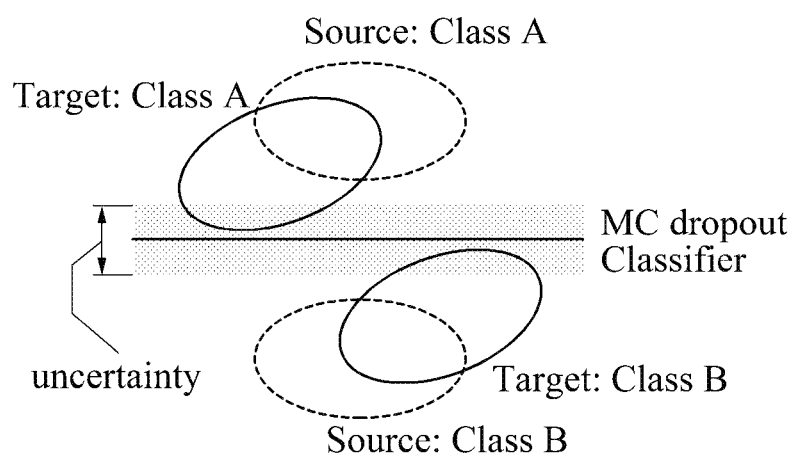
Figure 7D:
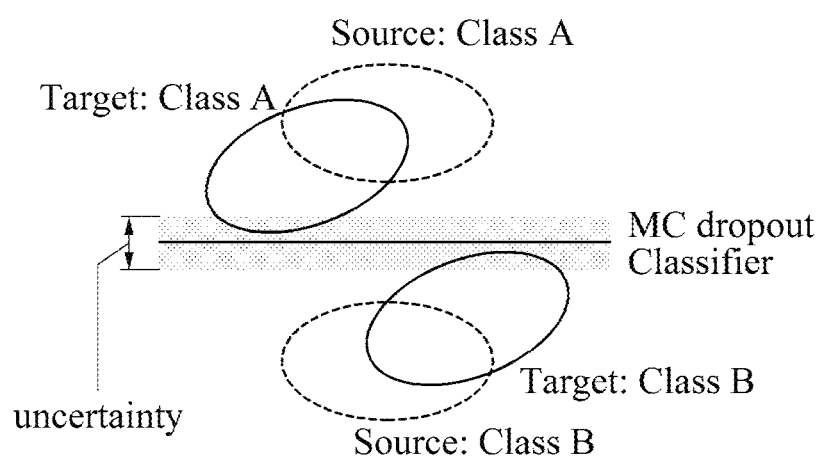
Figure 7E:
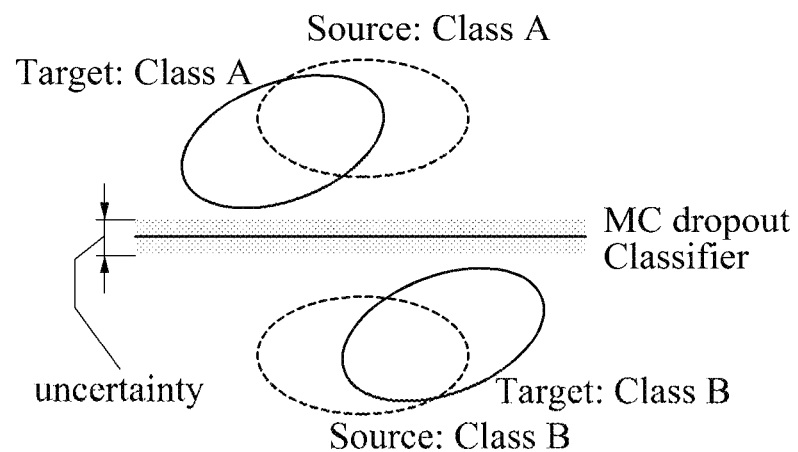

Referring to FIGS. 7C to 7E, the performance for the target domain was improved by sequentially and iteratively performing the forward pass-back propagation for each input value in the method for unsupervised domain adaptation according to an exemplary embodiment. That is, the uncertainty about the learning parameter of the deep learning model is minimized according to an exemplary embodiment, and accordingly, the deep learning model outputs almost the same or similar results for each of the source domain and the target domain.

Figure 7F:
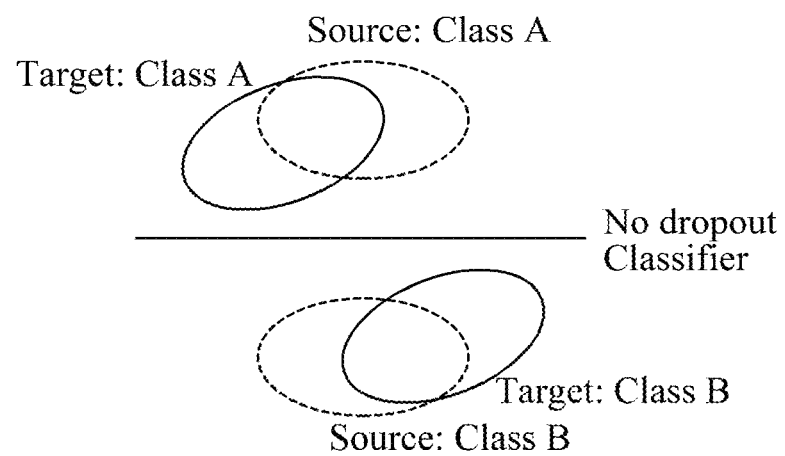

Referring to FIG. 7F, unsupervised domain adaptation of the deep learning model was completed and the MC dropout was removed, and accordingly, securing an unsupervised domain adaptation model was completed.

According to an exemplary embodiment, the unsupervised domain adaptation model, i.e., the model with unsupervised domain adaptation on the source domain completed, has the same structure as compared to the original model, i.e., a model with supervised learning on the source domain completed, and has a form in which the learning parameter of the original model is optimized to operate well in the target domain. The unsupervised domain adaptation technique according to the exemplary embodiment does not need structural changes such as separating the deep learning model trained for the source domain, and uses the structure of the original model as it is. Accordingly, according to the exemplary embodiment, there is no inconvenience, such as using a limited model for each method or performing relearning after changing the original model in order to perform unsupervised domain adaptation.

Figure 8A:
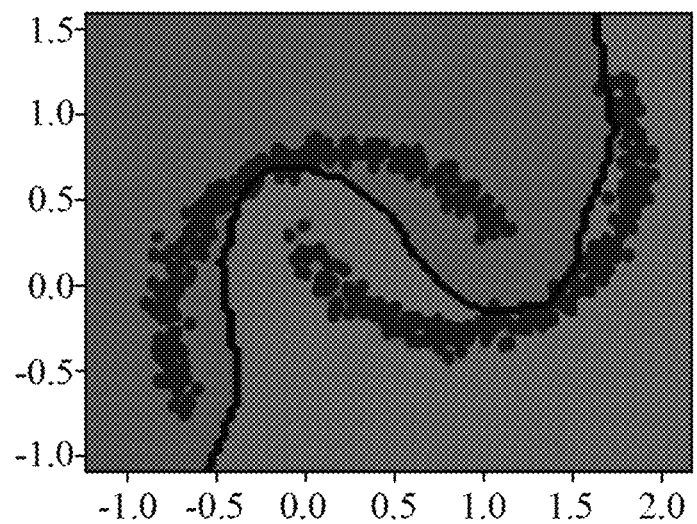
FIGS. 8A and 8B are examples of comparing results before and after application of the method for unsupervised domain adaptation according to an embodiment.
Figure 8B:
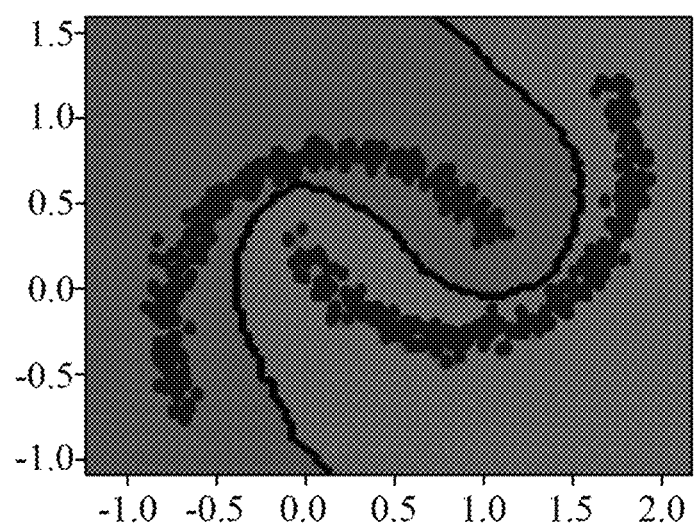

FIGS. 8A and 8B are examples of comparing results before and after application of the method for unsupervised domain adaptation according to an embodiment. Here, the source domain consists of two classes, such as red and green, and the target domain is expressed as blue dots with slightly deviated feature distributions. The source domain is labeled with color, but the target domain is being unlabeled.

The black boundary line illustrated in FIG. 8A represents classification performance of the original model trained for the source domain. Referring to FIG. 8A, it can be seen that the original model accurately distinguishes red and green, but does not completely classify blue points of which domains are different.

In addition, the black boundary line illustrated in FIG. 8B represents classification performance of the model obtained after domain adaptation according to the exemplary embodiment has been completed. Referring to FIG. 8B, it can be seen that the model obtained after domain adaptation has been completed can perfectly classify not only red and green but also blue dots.

FIGS. 9A to 9F are examples illustrating measurement results while changing the presence and absence of sampling and the number of sampling times of the MC dropout for a deep learning model with unsupervised domain adaptation according to an embodiment on the source domain completed.

Figure 9A:
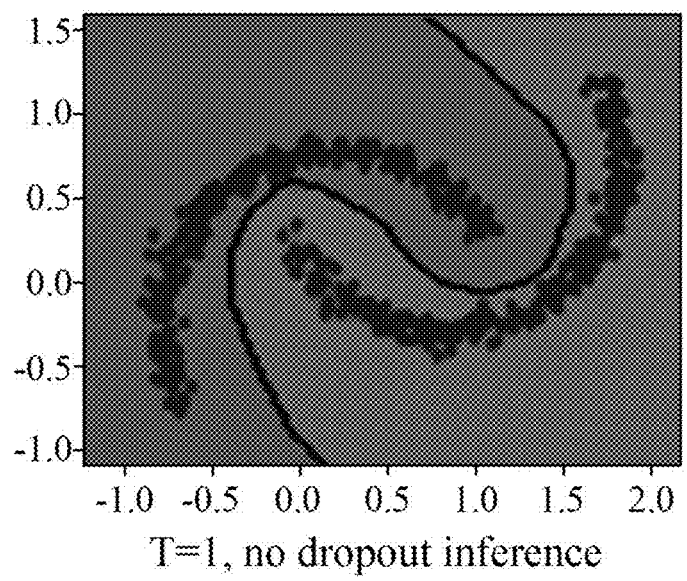
FIGS. 9A to 9F are examples illustrating measurement results while changing the presence and absence and number of times of sampling of an MC dropout for a deep learning model with the unsupervised domain adaptation according to an embodiment completed.
Figure 9B:
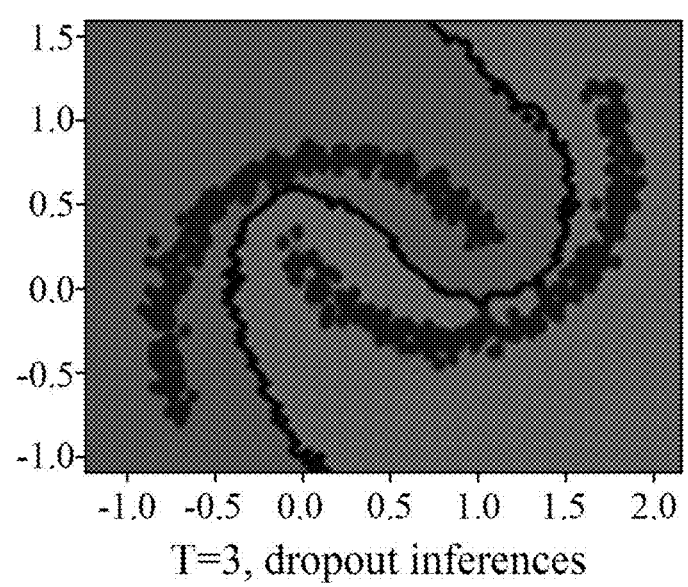
Figure 9C:
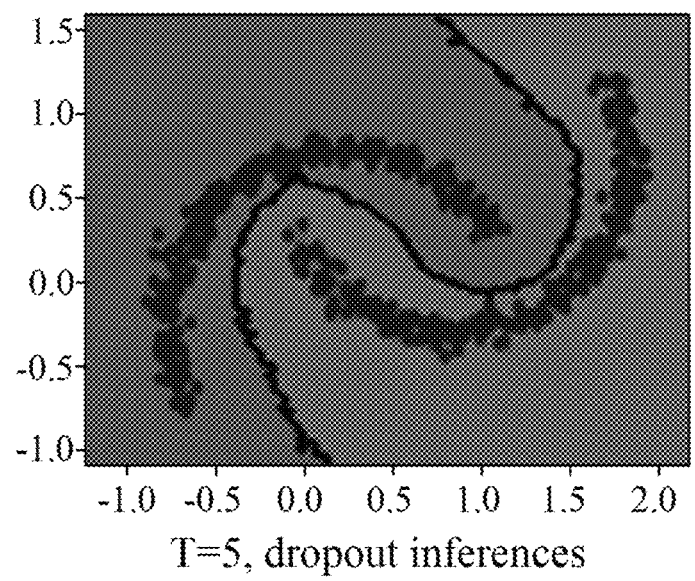
Figure 9D:
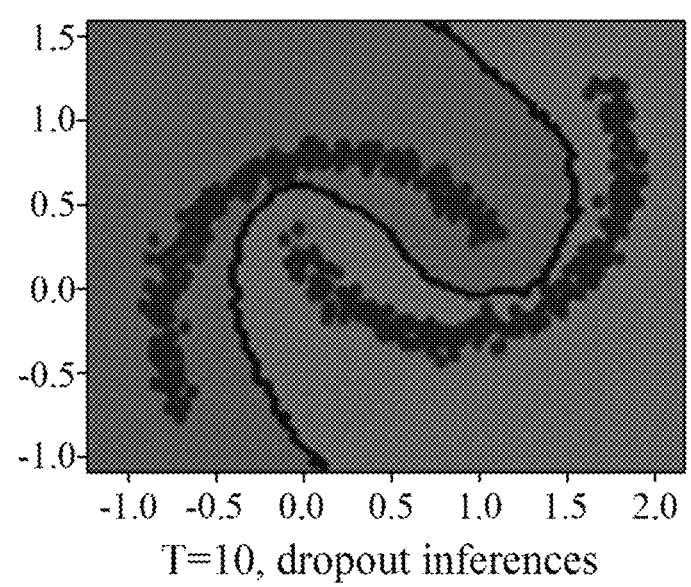
Figure 9E:
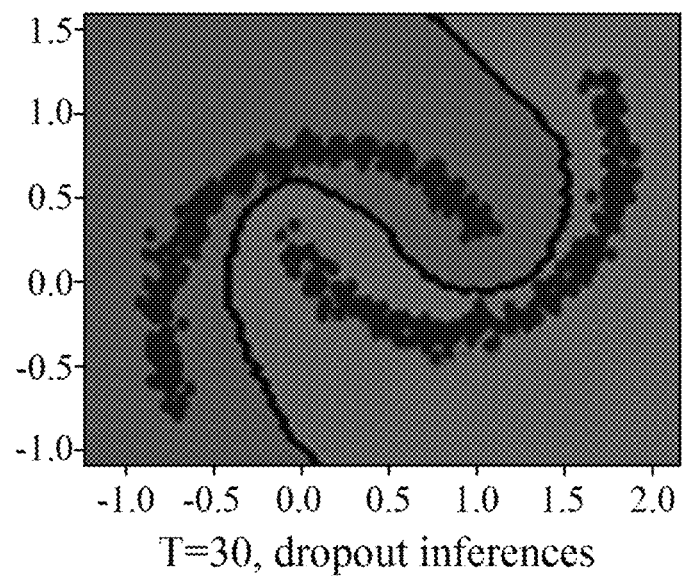
Figure 9F:
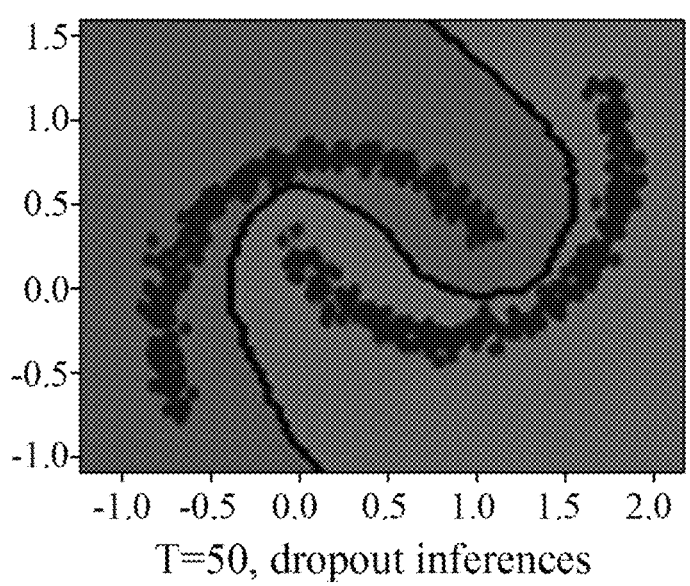

FIG. 9A illustrates the result of performing inference while the dropout is being removed from the deep learning model with unsupervised domain adaptation on the source domain completed, and FIGS. 9B to 9F illustrate results of performing inference while varying the number of sampling times (T) of dropouts in the deep learning model for which the unsupervised domain adaptation has been completed.

Referring to FIGS. 9A to 9F, it can be seen that the result of performing inference while the dropout is being removed from the deep learning model with unsupervised domain adaptation on the source domain completed is not significantly different from the result of performing the inference without removing the dropout from the deep learning model or is rather better.

FIG. 10 is an example obtained by comparing the performance of the method for unsupervised domain adaptation according to an embodiment with other unsupervised domain adaptation techniques.

Referring to FIG. 10, it can be seen that when comparing performance of the method for unsupervised domain adaptation according to an exemplary embodiment, performance when a deep learning model with supervised learning on the source domain completed is applied to a target domain as it is, performances of the DANN, ADDA, MCDDA, and GPDA techniques, respectively, the performance (SOTA: state-of-the-art) of the method for unsupervised domain adaptation according to the exemplary embodiment is the best.

Figure 11:
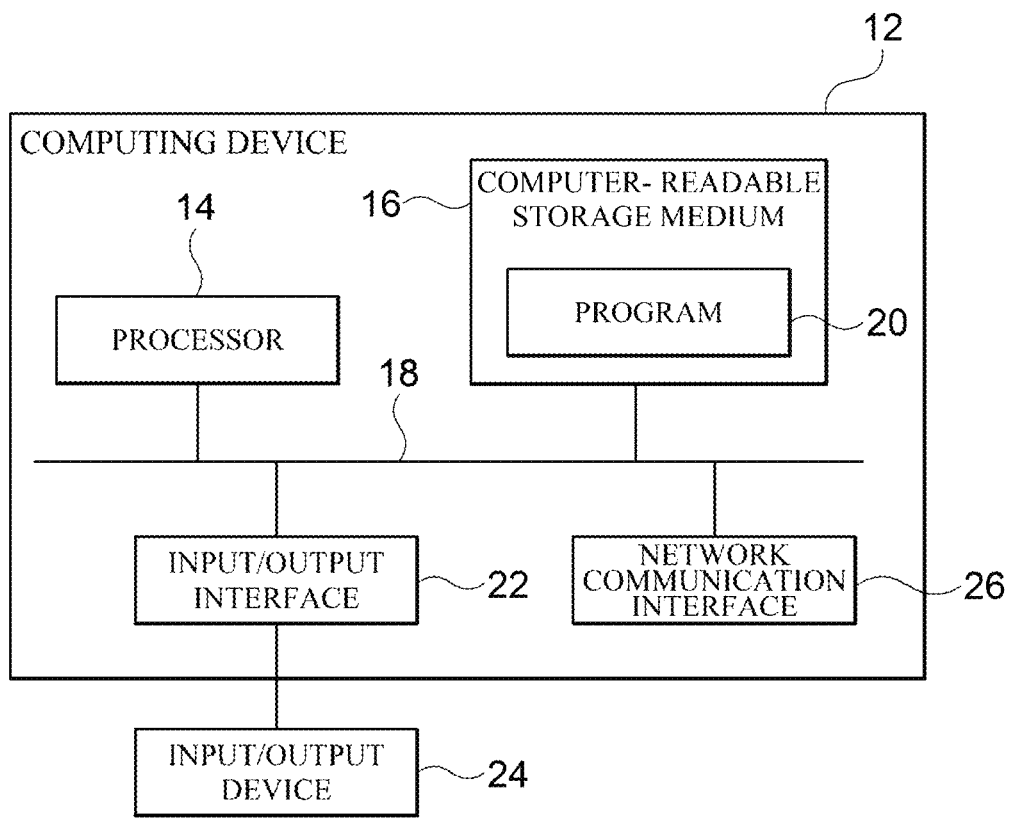
FIG. 11 is a block diagram for illustratively describing a computing environment including a computing device suitable for use in exemplary embodiments.

FIG. 11 is a block diagram illustrating and exemplifying a computing environment that includes a computing device suitable for use in the exemplary embodiment.

In the illustrated embodiment, each component may have different functions and capabilities in addition to those described below, and additional components may be included in addition to those described below.

An illustrated computing environment 10 includes a computing device 12. In one embodiment, the computing device 12 may be an apparatus 100 for unsupervised domain adaptation of a training scenario, or one or more components included in the apparatus 100 for unsupervised domain adaptation.

The computing device 12 includes at least one processor 14, a computer-readable storage medium 16, and a communication bus 18. The processor 14 may cause the computing device 12 to be operated according to the exemplary embodiment described above. For example, the processor 14 may execute one or more programs stored on the computer-readable storage medium 16. The one or more programs may include one or more computer-executable instructions, which, when executed by the processor 14, may be configured to cause the computing device 12 to perform operations according to the exemplary embodiment.

The computer-readable storage medium 16 is configured to store the computer-executable instruction or program code, program data, and/or other suitable forms of information. A program 20 stored in the computer-readable storage medium 16 includes a set of instructions executable by the processor 14. In one embodiment, the computer-readable storage medium 16 may be a memory (volatile memory such as a random access memory, non-volatile memory, or any suitable combination thereof), one or more magnetic disk storage devices, optical disk storage devices, flash memory devices, other types of storage media that are accessible by the computing device 12 and can store desired information, or any suitable combination thereof.

The communication bus 18 interconnects various other components of the computing device 12, including the processor 14 and the computer-readable storage medium 16.

The computing device 12 may also include one or more input/output interfaces 22 that provide an interface for one or more input/output devices 24, and one or more network communication interfaces 26. The input/output interface 22 and the network communication interface 26 are connected to the communication bus 18. The input/output device 24 may be connected to other components of the computing device 12 through the input/output interface 22. The exemplary input/output device 24 may include a pointing device (such as a mouse or trackpad), a keyboard, a touch input device (such as a touch pad or touch screen), a voice or sound input device, input devices such as various types of sensor devices and/or photographing devices, and/or output devices such as a display device, a printer, a speaker, and/or a network card. The exemplary input/output device 24 may be included inside the computing device 12 as a component constituting the computing device 12, or may be connected to the computing device 12 as a separate device distinct from the computing device 12.

According to an exemplary embodiment, by performing unsupervised domain adaptation using an uncertainty index for a learning parameter of a deep learning model without structural changes such as separating the deep learning model trained for a source domain, it is possible to achieve performance exceeding the result according to the conventional unsupervised domain adaptation technique.

In addition, since there is no inconvenience such as having to change the structure of the original model or perform relearning, a test execution speed and parameter size can be kept the same compared to the original model after the unsupervised domain adaptation has been completed.

In the above, although the present invention has been described in detail has been described in detail through representative examples, those skilled in the art to which the present invention pertains will understand that various modifications may be made thereto within the limit that do not depart from the scope of the present invention. Therefore, the scope of rights of the present invention should not be limited to the described embodiments, but should be defined not only by claims set forth below but also by equivalents of the claims.

What is claimed is:

1. An apparatus for unsupervised domain adaptation for allowing a deep learning model with supervised learning on a source domain completed to be subjected to unsupervised domain adaptation to a target domain, the apparatus comprising at least one processor and a computer-readable storage medium storing one or more programs including one or more computer-executable instructions executed by the at least one processor:

a first learning unit implemented by the at least one processor and the one or more computer-executable instructions executed by the at least one processor, the first learning unit configured to perform a forward pass by respectively inputting a pair $(x_s^i, y_s^i)$ of a plurality of first data $x_s^i$ belonging to the source domain and a label $y_s^i$ for each of the first data and a plurality of second data $x_T^j$ belonging to the target domain, and insert a dropout following a Bernoulli distribution, which is a trial probability p, into the deep learning model in a process of performing the forward pass; and a second learning unit implemented by the at least one processor and the one or more computer-executable instructions executed by the at least one processor, the second learning unit configured to perform a back propagation to minimize uncertainty about a learning parameter of the deep learning model by respectively using a predicted value for each class output through the forward pass and the label $y_s^i$, and an uncertainty vector for the second data $x_T^j$ output through the forward pass as inputs, wherein the first learning unit is further configured to iteratively perform the forward pass T times for one input value;

the predicted value for each class is an average value of T score vectors for a class output when the pair $(x_s^i, y_s^i)$ of the first data $x_s^i$ and the label $y_s^i$ is input to the deep learning model; and the uncertainty vector is a standard deviation of T score vectors for a class output when the second data $x_T^j$ is input to the deep learning model.

2. The apparatus of claim 1, wherein the first learning unit is further configured to insert the dropout in a Monte-Carlo sampling scheme.

3. The apparatus of claim 1, wherein a layer a layer into which the dropout is inserted first comprises a feature generator and a classifier into which an output of the feature generator is inputted, and the dropout is inserted into the classifier prior to performing the forward pass.

4. The apparatus of claim 3, wherein the second learning unit is further configured to adjust the learning parameter of the deep learning model by performing the back propagation so that a value of a loss function for the predicted value for each class and the label $y_s^i$ is minimized.

5. The apparatus of claim 3, wherein the second learning unit is further configured to adjust the learning parameter of the deep learning model by performing the back propagation in a manner of setting the value of the loss function for the uncertainty vector as an uncertainty index and allowing the uncertainty index to be learnt by the feature generator and the classifier, respectively, with Mini-Max.

6. The apparatus of claim 5, wherein the uncertainty index is a value obtained by taking L1 Norm or L2 Norm of the uncertainty vector.

7. The apparatus of claim 1, further comprising:

an inference unit implemented by the at least one processor and the one or more computer-executable instructions executed by the at least one processor, the inference unit configured to perform inference through the deep learning model after the dropout is removed after the unsupervised domain adaptation of the deep learning model has been completed.

8. A method for allowing a deep learning model with supervised learning on a source domain completed to be subjected to unsupervised domain adaptation to a target domain, the method comprising:

performing a forward pass by respectively inputting a pair $(x_s^i, y_s^i)$ of a plurality of first data $x_s^i$ belonging to the source domain and a label $y_s^i$ for each of the first data and a plurality of second data $x_T^j$ belonging to the target domain;

inserting a dropout following a Bernoulli distribution, which is a trial probability p, into the deep learning model in a process of performing the forward pass; and performing a back propagation to minimize uncertainty about a learning parameter of the deep learning model by respectively using a predicted value for each class output through the forward pass and the label $y_s^i$, and an uncertainty vector for the second data $x_T^j$ output through the forward pass as inputs, wherein the performing of the forward pass comprises iteratively performing the forward pass T times for one input value;

the predicted value for each class is an average value of T score vectors for a class output when the pair $(x_s^i, y_s^i)$ of the first data $x_s^i$ and the label $y_s^i$ are input to the deep learning model; and the uncertainty vector is a standard deviation of T score vectors for a class output when the second data $x_T^j$ is input to the deep learning model.

9. The method of claim 8, wherein the inserting of the dropout comprising inserting the dropout in a Monte-Carlo sampling scheme.

10. The method of claim 8, further comprising:

wherein a layer into which the dropout is inserted first comprises a feature generator and a classifier into which an output of the feature generator is inputted, and the dropout is inserted into the classifier prior to performing the forward pass.

11. The method of claim 10, wherein the performing of the back propagation comprises adjusting the learning parameter of the deep learning model by performing the back propagation so that a value of a loss function for the predicted value for each class and the label $y_s^i$ is minimized.

12. The method of claim 10, wherein the performing of the back propagation comprises adjusting the learning parameter of the deep learning model by performing the back propagation in a manner of setting the value of the loss function for the uncertainty vector as an uncertainty index and allowing the uncertainty index to be learnt by the feature generator and the classifier, respectively, with Mini-Max.

13. The method of claim 12, wherein the uncertainty index is a value obtained by taking L1 Norm or L2 Norm of the uncertainty vector.

14. The method of claim 8, further comprising:

performing inference through the deep learning model after the dropout is removed after the unsupervised domain adaptation of the deep learning model has been completed.

* * * * *